United States Patent [19]

Blankenship

[11] Patent Number: 5,545,695
[45] Date of Patent: Aug. 13, 1996

[54] ENCAPSULATED HYDROPHILIC POLYMERS AND THEIR PREPARATION

[75] Inventor: Robert M. Blankenship, Harleysville, Pa.

[73] Assignee: Rohm and Haas Company, Philadelphia, Pa.

[21] Appl. No.: 467,687

[22] Filed: Jun. 6, 1995

Related U.S. Application Data

[62] Division of Ser. No. 289,736, Aug. 12, 1994, Pat. No. 5,494,971.

[51] Int. Cl.$^6$ .................. C08F 265/02; C08F 265/04
[52] U.S. Cl. .................. 525/301; 525/303; 525/309
[58] Field of Search ......................... 525/296, 301, 525/303, 309, 317

[56] References Cited

U.S. PATENT DOCUMENTS

| | | | |
|---|---|---|---|
| 4,594,363 | 6/1986 | Blankenship | 521/64 |
| 4,880,842 | 11/1989 | Kowalski | 521/64 |
| 5,212,251 | 5/1993 | Lorah | 525/279 |
| 5,304,707 | 4/1994 | Blankenship | 588/255 |

FOREIGN PATENT DOCUMENTS

| | | |
|---|---|---|
| 31964 | 7/1981 | European Pat. Off. . |
| 426391 | 5/1991 | European Pat. Off. . |

*Primary Examiner*—Vasu S. Jagannathan
*Attorney, Agent, or Firm*—David T. Banchik

[57] ABSTRACT

A multistaged polymer containing a hydrophilic core fully encapsulated with a hydrophobic shell without a tiecoat layer is disclosed. A method is also disclosed for encapsulating hydrophilic polymers including the steps of:

(1) emulsion polymerizing a hydrophilic core polymer from about 5% by weight to about 100% by weight, based on the total weight of the core polymer, of a hydrophilic monoethylenically unsaturated monomer and from 0% by weight to about 95% by weight, based on the total weight of the core polymer, of at least one nonionic monoethylenically unsaturated monomer;

(2) emulsion polymerizing, in the presence of the core polymer, at least one shell polymer from about 90% by weight to about 99.9% by weight, based on the total weight of shell polymer, of at least one nonionic monoethylenically unsaturated monomer and from about 0.1% by weight to about 10% by weight, based on the total weight of the shell polymer, of an acid-functional monoethylenically unsaturated monomer,
   wherein the acid-functional monoethylenically unsaturated monomer is added to the polymerization of the shell polymer over 100% of the total shell monomer feed when the particle size of the core polymer is from about 130 nm to about 2.0 microns and over the first 50% of the total shell monomer feed when the particle size of the core polymer is less than about 130 nm.

This method of encapsulating a hydrophilic polymer with a hydrophobic polymer eliminates the need for a tiecoat layer.

2 Claims, No Drawings

ENCAPSULATED HYDROPHILIC POLYMERS AND THEIR PREPARATION

This is a divisional of application Ser. No. 08/289,736, filed Aug. 12, 1994 now U.S. Pat. No. 5,494,971.

FIELD OF THE INVENTION

This invention relates to multistaged polymer particles and their preparation and, more particularly, to multistaged polymer particles of a hydrophilic polymer stage encapsulated with at least one hydrophobic polymer stage.

BACKGROUND OF THE INVENTION

Multistaged polymers containing a hydrophilic core polymer encapsulated by a hydrophobic shell polymer are known. It was, however, believed that a shell polymer of extremely non-polar or low-polar hydrophobic monomers ("hydrophobic shell"), such as styrene, α-methyl styrene, vinyl toluene, ethylene, vinyl chloride and vinylidene chloride, could not be formed directly on a core containing a high level of hydrophilic monomers ("hydrophilic core") without either:

(1) copolymerizing the extremely non-polar or low-polar hydrophobic monomers with vinyl acetate, acrylonitrile or methacrylamide; or (2) first forming a tiecoat on the hydrophilic core.

The tiecoat (referred to in some of the prior patents as "the first stage of sheath formation") was generally an acrylic polymer which compatibilized the hydrophilic core polymer with the one or more hydrophobic shell polymers, particularly for a hydrophilic core polymer having a particle size diameter of less than about 280 nanometers (nm).

SUMMARY OF THE INVENTION

This invention is directed to a multistaged polymer containing a hydrophilic core polymer fully encapsulated with a hydrophobic shell polymer without the rise of a tiecoat layer. The hydrophilic core polymer is formed from about 5% by weight to about 100% by weight, based on the total weight of the core polymer, of a hydrophilic monoethylenically unsaturated monomer and front 0% by weight to about 95% by weight, based on the total weight of the core polymer, of at least one nonionic monoethylenically unsaturated monomer. The hydrophobic shell polymer formed from about 90% by weight to about 99.9% by weight, based on the total weight of shell polymer, of at least one nonionic monoethylenically unsaturated monomer and from about 0.1% by weight to about 10% by weight based on the total weight of the shell polymer, of an acid-functional monoethylenically unsaturated monomer. The shell polymer fully encapsulates the core polymer and does not require a tiecoat layer.

This invention is also directed to a method for encapsulating a hydrophilic core polymer with a hydrophobic shell polymer including the steps of:

(1) emulsion polymerizing a hydrophilic core polymer front about 5% by weight to about 100% by weight, based on the total weight of the core polymer, of a hydrophilic monoethylenically unsaturated monomer and from 0% by weight to about 95% by weight, based on the total weight of the core polymer, of at least one nonionic monoethylenically unsaturated monomer;

(2) emulsion polymerizing, in the presence of the core polymer, at least one shell polymer front about 90% by weight to about 99.9% by weight, based on the total weight of shell polymer, of at least one nonionic monoethylenically unsaturated monomer and from about 0.1% by weight to about 10% by weight, based on the total weight of the shell polymer, of an acid-functional monoethylenically unsaturated monomer, wherein the acid-functional monoethylenically unsaturated monomer is added to the polymerization of the shell polymer over 100% of the total shell monomer feed when the particle size of the core polymer is front about 130 nm to about 2.0 microns and over the first 50% of the total shell monomer feed when the particle size of the core polymer is less than about 130 nm.

This method of encapsulating a hydrophilic polymer with a hydrophobic polymer eliminates the need for a tiecoat layer.

DESCRIPTION OF THE INVENTION

The present invention involves a multistaged polymer containing a hydrophilic core polymer fully encapsulated with a hydrophobic shell polymer and its method of preparation.

Description of Hydrophilic Core Polymer

The hydrophilic core polymer of the multistaged polymer of this invention is the product of emulsion polymerizing front about 5% by weight to about 100% by weight, based on the total weight of the core polymer, of a hydrophilic monoethylenically unsaturated monomer and from 0% by weight to about 95% by weight, based on the total weight of the core polymer, of at least one nonionic monoethylenically unsaturated monomer.

Hydrophilic core polymers containing at least about 5% by weight, based on the total weight of the core polymer, of at least one hydrophilic monoethylenically unsaturated monomer have practical swellability for the purposes of the present invention. There may be instances wherein, because of the hydrophobicity of certain comonomers or combinations thereof in conjunction with the hydrophobic/hydrophilic balance of a particular acid monomer, the copolymer may require less than 5% by weight, based on the total weight of the core polymer. Preferably, the level of hydrophilic monomer is from about 5% to about 100% by weight, based on the total weight of the core polymer; more preferably, from about 20% to about 60% by weight; and most preferably, from about 30% to about 50% by weight. The hydrophilic core polymer may be made in a single stage or step of the sequential polymerization or may be made by a plurality of steps in sequence.

This invention contemplates a hydrophilic core polymer wherein at least one hydrophilic monoethylenically unsaturated monomer is polymerized alone or with at least one nonionic monoethylenically unsaturated monomer. This process also contemplates, and includes in the term "hydrophilic monoethylenically unsaturated monomer," the use of a nonpolymeric compound containing at least one carboxylic acid group which absorbed into the core polymer before, during or after the polymerization of the hydrophobic shell polymer as a replacement for the hydrophilic monoethylenically unsaturated monomer in the hydrophilic core polymer, as described in U.S. Pat. No. 4,880,842. In addition, this invention contemplates, and includes in the term "hydrophilic monoethylenically unsaturated monomer," the use of a latent hydrophilic core polymer which contains no hydrophilic monoethylenically unsaturated monomer but which is swellable upon hydrolysis to a hydrophilic core polymer as described in U.S. Pat. No. 5,157,084.

Suitable hydrophilic monoethylenically unsaturated monomer useful for making the core polymer include monoethylenically unsaturated monomers containing acid-functionality such as monomers containing at least one carboxylic acid group including acrylic acid and methacrylic acid, acryloxypropionic acid, (meth)acryloxypropionic acid, itaconic acid, aconitic acid, maleic acid or hydride, fumaric acid, crotonic acid monomethyl maleate, monomethyl fumarate monomethyl itaconate and like. Acrylic acid and methacrylic acid are preferred.

Suitable nonpolymeric compounds containing at least one carboxylic acid group include $C_6$–$C_{12}$ aliphatic or aromatic monocarboxylic acids and dicarboxylic acids, such as benzoic acid, m-toluic acid, p-chlorobenzoic acid, o-acetoxybenzoic acid, azelaic acid, sebacic acid, octanoic acid, cyclohexanecarboxylic acid, lauric acid and monobutyl phthalate and the like.

Suitable nonionic monoethylenically unsaturated monomers for making the hydrophilic core polymer include styrene, α-methyl styrene, vinyltoluene, ethylene, vinyl acetate, vinyl chloride, vinylidene chloride, acrylonitrile, (meth)acrylamide, ($C_1$–$C_{20}$) alkyl or ($C_3$–$C_{20}$) alkenyl esters of (meth)acrylic acid, such as methyl (meth)acrylate, ethyl (meth)acrylate, butyl (meth)acrylate, 2-ethylhexyl (meth)acrylate, benzyl (meth)acrylate, lauryl (meth)acrylate, oleyl (meth)acrylate, palmityl (meth)acrylate, stearyl (meth)acrylate and the like.

The hydrophilic core polymer, whether obtained by a single stage process or a process involving several stages, has an average size of about 50 nm to about 2.0 micron, preferably 100 nm to 1.0 micron, more preferably 200 nm to 500 nm diameter in unswollen condition. If the core is obtained from a seed polymer, the seed polymer may have an average particle size of about 30 nm to about 200 nm.

The hydrophilic core polymer may also optionally contain less than about 20% by weight, based on the total weight of tile core polymer, preferably about 0.1% to about 3% by weight, of polyethylenically unsaturated monomer, wherein the amount used is generally approximately directly proportional to the amount of hydrophilic monoethylenically unsaturated monomer used. Alternatively, the hydrophilic core polymer may contain from about 0.1% to about 60% by weight, based on the total weight of the core polymer, of butadiene.

Suitable polyethylenically unsaturated monomers include comonomers containing at least two addition polymerizable vinylidene groups and are α,β-ethylenically unsaturated monocarboxylic acid esters of polyhydric alcohols containing 2–6 ester groups. Such comonomers include alkylene glycol diacrylates and dimethacrylates, such as for example, ethylene glycol diacrylate, ethylene glycol dimethacrylate, 1,3-butylene glycol diacrylate, 1,4-butylene glycol diacrylate propyleneglycol diacrylate and triethyleneglycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide, methylene bis-methacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl (meth)acrylates; dicyclopentenyloxy (meth)acrylates; unsaturated esters of glycol monodicyclopentenyl ethers; allyl esters of a,b-unsaturated mono- and dicarboxylic acids having terminal ethylenic unsaturation including allyl methacrylate, allyl acrylate, diallyl maleate, diallyl fumarate, diallyl itaconate and the like.

Description of Hydrophobic Shell Polymer

The hydrophobic shell polymer of the multistaged polymer of this invention is the product of emulsion polymerizing from about 90% by weight to about 99.9% by weight, based on the total weight of the shell polymer, of at least one nonionic monoethylenically unsaturated monomer and from about 0.1% by weight to about 10% by weight, based on the weight of the shell polymer, of an acid-functional monoethylenically unsaturated monomer.

Suitable nonionic monoethylenically unsaturated monomers for making the hydrophobic shell polymer include styrene, co-methyl styrene, vinyltoluene, ethylene, vinyl acetate, vinyl chloride, vinylidene chloride, acrylonitrile, (meth)acrylamide, ($C_1$–$C_{20}$) alkyl or ($C_3$–$C_{20}$) alkenyl esters of (meth)acrylic acid, such as methyl (meth)acrylate, ethyl (meth)acrylate, butyl (meth)acrylate, 2-ethylhexyl (meth)acrylate, benzyl (meth)acrylate, lauryl (meth)acrylate, oleyl (meth)acrylate, palmityl (meth)acrylate, stearyl (meth)acrylate and the like. Styrene is preferred.

Suitable monoethylenically unsaturated monomers containing acid-functionality for making the hydrophobic polymer shell include acrylic acid, methacrylic acid, acryloxypropionic acid, (meth)acryloxypropionic acid, itaconic acid, aconitic acid, maleic acid, maleic anhydride, fumaric acid, crotonic acid, monomethyl maleate, monomethyl fumarate, monomethyl itaconate and the like. Acrylic acid and methacrylic acid are preferred.

Description of Polymerization Method

The method for encapsulating hydrophilic polymers includes the steps of sequentially:

(1) emulsion polymerizing a hydrophilic core polymer; and (2) emulsion polymerizing, in the presence of the hydrophilic core polymer, at least one hydrophobic shell polymer to completely encapsulate the core. The crux of the invention is the manner and timing of the addition of the acid-functional monoethylenically unsaturated monomer in the polymerization of the hydrophobic shell polymer. When the particle size of the core polymer is from about 130 nm to about 2.0 microns, the acid-functional monoethylenically unsaturated monomer used to make the shell may be added over 100% of the shell monomer feed, based on the total weight of the shell monomer feed, preferably over the first 50% of the feed, more preferably over the first 25% of the feed and most preferably over the first 10% of the feed. When the particle size of the core polymer is less than about 130 nm, the acid-functional monoethylenically unsaturated monomer may be added over the first 50% of the feed, more preferably over the first 25% of the feed and most preferably over the first 10% of the feed.

As used herein, the term "sequentially emulsion polymerized" or "sequentially emulsion produced" refers to polymers (including homopolymers and copolymers) which are prepared in aqueous medium by an emulsion polymerization process wherein the dispersed polymer particles of a preformed latex or "seed" polymer in the aqueous medium are increased in size by deposition thereon of polymerized product of one or more successive monomer charges introduced into the medium containing dispersed particles of the preformed latex in one or more subsequent stages.

In the sequential emulsion polymerization with which the present invention is concerned, the term "seed" polymer is used to refer to an aqueous emulsion polymer dispersion which may be the initially-formed dispersion, that is, the product of a single stage of emulsion polymerization or it may be the emulsion polymer dispersion obtained at the end of any subsequent stage except the final stage of the sequential polymerization. Thus, a hydrophilic core polymer which is herein intended to be fully encapsulated with a shell by one or more subsequent stages of emulsion polymerization may itself be termed a seed polymer for the next stage wherein the shell-forming polymer is deposited on such seed polymer particles.

The method of this invention contemplates that the hydrophobic shell polymer may be made in a single stage or step of the sequential polymerization or may be made by a plurality of steps in sequence following the polymerization of hydrophilic core polymer without the need for a tiecoat layer. The first stage of emulsion polymerization in the process of the present invention may be the preparation of a seed polymer containing small dispersed polymer particles insoluble in the aqueous emulsion polymerization medium. This seed polymer may or may not contain any hydrophilic monomer component but provides particles of minute size which form the nuclei on which the hydrophilic core polymer, with or without nonionic comonomer, is formed.

A water-soluble free radical initiator is utilized in the aqueous emulsion polymerization. Suitable water-soluble free radical initiators include hydrogen peroxide; tert-butyl peroxide; alkali metal such as sodium, potassium and lithium persulfate; ammonium persulfate; and mixture of such an initiator with a reducing agent, such as a sulfite, including an alkali metal metabisulfite, hydrosulfite, and hyposulfite; sodium formaldehyde sulfoxylate; and a reducing sugar, to form a redox system. The amount of initiator may be from 0.01% by weight to about 2% by weight of the monomer charged and in a redox system, a corresponding range of 0.01% by weight to about 2% by weight of reducing agent may be used. The temperature may be in the range of about 10° C. to 100° C. In the case of the persulfate systems, the temperature is preferably in the range of 60° C. to 90° C. In the redox system, the temperature is preferably in the range of 30° C. to 70° C., preferably below about 60° C., more preferably in the range of 30° C. to 45° C. The proportion of emulsifier may be zero, in the situation wherein a persulfate initiator is used, to about 0.75% by weight, based on the weight of total weight of the core polymer. By carrying out the emulsion polymerization while maintaining low levels of emulsifier, the subsequent stages of polymer-formation deposit the most-recently formed polymer on the existing dispersed polymer particles resulting from the preceding step or stage. As a general rule, the amount of emulsifier should be kept below that corresponding to the critical micelle concentration for a particular monomer system, but while this limitation is preferable and produces a unimodal product, it has been found that in some systems the critical micelle concentration of the emulsifier may be exceeded somewhat without the formation of an objectionable or excessive number of dispersed micelles or particles. It is for the purpose of controlling the number of micelles during the various stages of polymerization so that the deposition of the subsequently formed in the polymer in each stage occurs upon the dispersed micelles or particles formed in the previous stages, that the concentration of emulsifier is kept low.

Any nonionic or anionic emulsifier may be used, either alone or together. Examples of suitable nonionic type of emulsifier include tert-octylphenoxyethylpoly(39)-ethoxyethanol, and nonylphenoxyethylpoly-(40)ethoxyethanol.

Examples of suitable anionic emulsifiers include sodium lauryl sulfate, sodium dodecylbenzenesulfonate, and tert-octylphenoxyethoxypoly(39)ethoxyethyl sulfate, sodium salt. The viscosity-average molecular weight of the polymer formed in a given stage may range from 100,000, or lower if a chain transfer agent is used, to several million molecular weight. When 0.1% by weight to 20% by weight, based on the weight of the monomer, of a polyethylenically unsaturated monomer mentioned hereinbefore is used in making the acid polymer, the molecular weight is increased whether or not crosslinking occurs. The use of the polyethylenically unsaturated monomer reduces the tendency of the core polymer to dissolve when the multistaged polymer is treated with a swellant for the core. If it is desired to produce a hydrophilic core polymer having a molecular weight in the lower part of the range, such as from 500,000 down to as low as about 20,000, it is frequently most practical to do so by avoiding the polyethylenically unsaturated monomers and using a chain transfer agent instead, such as 0.05% to 2% or more thereof, examples being alkyl mercaptans, such as sec-butyl mercaptan.

The polymerization of the shell polymer may be performed in the same reaction vessel in which the formation of the core was accomplished or the reaction medium containing the dispersed core particles may be transferred to another reaction container. It is generally unnecessary to add emulsifier unless a polymodal product is desired, but in certain monomer/emulsifier systems for forming the shell, the tendency to produce gum or coagulum in the reaction medium may be reduced or prevented by the addition of about 0.05% to about 2.0% by weight, based on total weight of the shell polymer, of emulsifier without detriment to the deposition of the polymer formed on the previously formed core particles.

The amount of polymer deposited to form shell polymer is generally such as to provide an overall size of the multistage polymer particle of about 70 nm to about 4.5 microns, preferably about 100 nm to about 3.5 microns, more preferably about 200 nm to about 2.0 microns, in unswollen condition (that is, before any neutralization to raise the pH to about 6 or higher) whether the shell polymer is formed in a single stage or in a plurality of stages. In unswollen state, the ratio of core weight to the total weight on average is from 1:4 to 1:100.

Preferred Embodiment

The method of the present invention may be extended to form voided polymer particles by adding to the hydrophilic core polymer fully encapsulated with a hydrophobic shell polymer, a suitable swelling agent to which the hydrophobic shell polymer is permeable.

In a preferred embodiment, voided polymer particles may be formed by swelling the core polymer with a suitable conjugate base and a solvent, when necessary, which permeates through the shell polymer and then drying the swollen multistaged polymer particles. The voided polymer particles produced by the method of this invention impart improved gloss, brightness and opacity to paper coating formulations to which they are added.

The monomers used and the relative proportions thereof in any hydrophobic shell polymer formed should be such that it is permeable to an aqueous or gaseous volatile or fixed basic swellant for the hydrophilic core polymer. Monomeric mixtures for making the hydrophobic shell polymer contain from about 0.1% by weight to about 10% by weight, based on the total weight of the shell polymer, of an acid-functional monoethylenically unsaturated monomer. However, the proportion of acid-functional monoethylenically unsaturated monomer in the shell polymer should not exceed one-third the proportion thereof in the core polymer. The content of acid-functional monoethylenically unsaturated monomer in the shell polymer may serve several functions:

(1) stabilizing of the final sequential polymer dispersion;
(2) assuring permeability of the hydrophobic shell polymer to a swellant for the hydrophilic core polymer; and
(3) compatibilizing the hydrophobic shell polymer with the hydrophilic core polymer so that the core may be fully encapsulated with shell.

The hydrophilic core polymer of the multistage polymer particle is swollen when the polymer particles are subjected to a basic swelling agent that permeates the shell to at least partially neutralize (to a pH of at least about 6 to 10) the hydrophilic-functionality of the hydrophilic core polymer and thereby to cause swelling by hydration of the hydrophilic core polymer. The expansion may involve partial merging of the outer periphery of the core into the pores of the inner periphery of the shell and also partial enlargment or bulging of the shell and the entire particle overall. When the swelling agents removed by drying, the shrinkage of the core tends to develop a void, the extent of which depends upon the resistance of the shell to restoration to its previous size.

Suitable swelling agents for hydrophilic core polymer include volatile bases such as ammonia, ammonium hydroxide, and volatile lower aliphatic amines, such as morpholine, trimethylamine, and triethylamine, and the like; fixed or permanent bases such as potassium hydroxide, lithium hydroxide, zinc ammonium complex, copper ammonium complex, silver ammonium complex, strontium hydroxide, barium hydroxide and the like. Solvents, such as, for example, ethanol, hexanol, octanol, Texanol® solvent and those described in U.S. Pat. No. 4,594,363, may be added to aid in fixed or permanent base penetration.

The voided latex particles produced by the method of the present invention are useful in aqueous coating compositions, such as aqueous-based paint and paper coatings. The voided polymer particles produced by the method of this invention impart improved gloss, brightness and opacity to paper coating formulations to which they are added. Also, the voided polymer particles produced by the method of this invention impart opacity to aqueous coating compositions, such as paints, to which they are added.

When the hydrophilic core polymer is fully encapsulated, it does not titrate with alkali metal bases under normal analytical conditions of about 1 hour and at room temperature. To demonstrate full encapsulation in the illustrative examples, samples were removed during the course of the shell polymerization and titrated with sodium hydroxide. The amount of shell monomer feed varied to fully encapsulate the hydrophilic core polymers. It is desirable to have lower amounts of shell monomer to achieve full encapsulation.

The following examples illustrate specific aspects and particular embodiments of the invention which, however, in not to be construed as limited thereby.

EXAMPLE 0

Synthesis of Hydrophilic Core Polymer (40% Hydrophilic Monoethylenically Unsaturated Monomer)

(a) A 5-liter, four necked, round bottom flask is equipped with paddle stirrer, thermometer, nitrogen inlet and reflux condenser. Deionized water, 1700 grams, is added to the kettle and heated to 85° C. under a nitrogen atmosphere A monomer emulsion consisting of 335 grams of deionized water, 3.5 grams of sodium dodecylbenzenesulfonate (SDS, 23 ), 4.35 grams of methacrylic acid, and 364.5 grams of methyl methacrylate is prepared. A portion of this monomer emulsion, 82 grams, is added to the heated kettle. After the removal of the 82 grams of monomer emulsion, 7 grams of SDS and 241 grams of methacrylic acid are added to the remaining monomer emulsion. After stirring the monomer emulsion kettle charge for five minutes at 800° C. under nitrogen, a solution of 2.75 grams of sodium persulfate in 15 grams of deionized water is added to the kettle. A 1° to 2° C. reaction exotherm occurs, the reaction mixture is stirred for 10 minutes. The remaining monomer emulsion is then added to the kettle over a 2 hour period at 80° C. After the completion of the monomer feed, the dispersion is held at 80° C. for 20 minutes, cooled to 25° C. and filtered to remove any coagulum formed. The filtered dispersion has a pH of 3.11, 22.27% solids content and an average particle size diameter of 330 nm.

(b) The process in core synthesis (a) was repeated except the SDS level in the monomer emulsion was increased to 12 grams from 3.5 grams and the amount of SDS added to the monomer emulsion after removal of the monomer preform was raised to 14 grams from 7 grams. The filtered dispersion has a pH of 3.16, a 22.3% solids content and an average particle size of 208 nm.

(c) A 5-liter, four necked, round bottom flask is equipped with paddle stirrer, thermometer, nitrogen inlet and reflux condenser. Deionized water, 1700 grams, is added to the kettle and heated to 85° C. under a nitrogen atmosphere. A monomer emulsion consisting of 335 grams of deionized water, 20.0 g of sodium dodecyl benzene sulfonate (SDS, 23%), 4.35 grams of methacrylic acid, and 364.5 grams of methyl methacrylate is prepared. A portion of this monomer emulsion, 100 grams, is added to the heated kettle. After the removal of the 100 grams of monomer emulsion, 22 grams of SDS and 241 grams of methacrylic acid are added to the remaining monomer emulsion. After stirring the monomer emulsion kettle charge for five minutes at 80° C. under nitrogen, a solution of 2.75 grams of sodium persulfate in 15 grams of deionized water is added to the kettle. A 1° to 2° C. reaction exotherm occurs, the reaction mixture is stirred for 10 minutes. The remaining monomer emulsion is then added to the kettle over a 2-hour period at 80° C. After the completion of the monomer feed, the dispersion is held at 80° C. for 20 minutes, cooled to 25° C. and filtered to remove any coagulum formed. The filtered dispersion has pH of 3.11, 22.28% solids content and an average particle size of 132 nm.

EXAMPLE 1

Acid-functional Monoethylenically Unsaturated Monomer (Acrylic Acid) added over first 2.7% Shell Monomer Feed (Core Particle Size=330 nm)

A 5-liter round-bottomed flask is equipped with paddle stirrer, thermometer, nitrogen inlet and reflux condenser. To 2070 grams of deionized water heated to 90° C. in the flask under a nitrogen atmosphere there is added 1.6 grams of sodium persulfate dissolved in 25 grams of deionized water. This is immediately followed by 383.58 grams of the core prepared in Example 0-(a). A monomer emulsion consisting of 400 grams of deionized water, 4.5 grams of SDS and 1080 grams of styrene is added to the kettle at the rate of 4 grams/minute. A separate feed of 12.5 grams of acrylic acid in 38.5 grams of deionized water is started at the same time as the monomer emulsion feed, at the rate of 5 grams/minute. Along with these feeds a solution of 2.77 grams of sodium persulfate in 130 grams of deionized water is co-fed to the kettle at the rate of 1.3 grams/minute. The reaction mixture is held at 80° C. and after 10 minutes the acrylic acid cofeed is complete and the monomer emulsion feed rate is increased to 8 grams/minutes. Twenty minutes later the monomer emulsion feed rate is increased again to 19.5 grams/minute and the reaction temperature is allowed to increase to 90° C. After 1157 grams of the monomer emulsion has been fed to the reaction mixture, a solution of 42.0 grams of ammonium hydroxide (28%) in 72 grams of deionized water is added to the kettle. After all of the monomer emulsion and catalyst cofeed have been added, the reaction mixture is held at 90° C. for 10 minutes. This is followed by a cofeed of 2 grams of sodium persulfate in 100 grams of deionized water over a 15 minute period. The reaction mixture is then cooled to room temperature and filtered to remove any coagulum formed. The final latex product had a 27.23% solids content and pH of 9.7. Diluted latex was dried on a microscope slide and immersed in hydrocarbon oil ($n_D$=1.51) and examined with an optical microscope at 1000×. A single air void can be observed inside of each particle as a dark circle. The swollen particle was incorporated into a film to measure the Kubelka-Munk scattering coefficient (S/mil) as described in U.S. Pat. No. 4,427,836. S/mil of the resultant film was 0.45. Samples of either high acid core becomes completely soluble when neutralized with sufficient base. But, when totally covered by the polymer sheath, hard bases such as sodium hydroxide will not neutralize the core at room temperature. Sodium hydroxide titration on samples removed during the course of this reaction demonstrated that complete core encapsulation occurred after the polymerization of 400 grams of monomer emulsion onto the core.

EXAMPLE 2

Acid-functional Monoethylenically Unsaturated Monomer (Acrylic Acid) added over 100% Shell Monomer Feed (Core Particle Size=330 nm)

The reaction in example 1 was repeated, except that the acrylic acid was added to the monomer emulsion. The resulting latex had a 27.23% solids content, pH of 9.7 and a S/mil of 0.28. Voids were observed in the dry polymer particles through examination via the microscope method described in Example 1. Titration of in-process samples demonstrated complete core encapsulation after the polymerization of 1000 grams of monomer emulsion onto the core.

EXAMPLE 3

Acid-functional Monoethylenically Unsaturated Monomer (Methacrylic Acid) added over first 2.7% Shell Monomer Feed (Core Particle Size=330 nm)

The reaction in Example 1 was repeated, except that methacrylic acid (15 grams) was used in place of the acrylic acid. The resulting latex had a 27.04% solids content, pH of 9.6 and a S/mil of 0.3. Voids were observed in the dry polymer particles through examination via the microscope method described in Example 1. Titration of in-process samples demonstrated complete core encapsulation after the polymerization of 400 grams of monomer emulsion onto the core.

EXAMPLE 4

Acid-functional Monoethylenically Unsaturated Monomer (Methacrylic Acid) added over 100% Shell Monomer Feed (Core Particle Size=330 nm)

Example 3 was repeated except the methacrylic acid was added to the monomer emulsion. The reaction was thicker at the end of feeds and 300 grams of extra water was added. The resulting latex had a 25.59% solids content, pH of 9.7 and a S/mil of 0.2. Voids were observed in the dry polymer particles through examination via the microscope method described in Example 1. Titration of in-process samples demonstrated complete core encapsulation after the polymerization of 800 grams of monomer emulsion onto the core.

EXAMPLE 5

Fixed Base Swellant

Example 1 was repeated except 60 grams of diethanolamine was used in place of the ammonia. The resulting latex had a 27.81% solids content, pH of 8.7 and a S/mil of 0.2. Voids were observed in the dry polymer particles through examination via the microscope method described in Example 1. Titration of in-process samples demonstrated complete core encapsulation after the polymerization of 400 grams of monomer emulsion onto the core.

EXAMPLE 6

Acid-functional Monoethylenically Unsaturated Monomer (Acrylic Acid) added over first 1.6% Shell Monomer Feed (Core Particle Size=208 nm and Acid Feed Time=10 minutes)

A 5-liter round-bottomed flask is equipped with paddle stirrer, thermometer, nitrogen inlet and reflux condenser. To 1192 grams of deionized water heated to 81° C. in the flask under a nitrogen atmosphere there is added 3.6 grams of sodium persulfate dissolved in 60 grams of deionized water. This is immediately followed by 142.6 grams of the core prepared in Example 0-(b). A monomer emulsion consisting of 723 grams of deionized water, 8.04 grams of SDS and 1710.6 grams of styrene is added to the kettle at the rate of 4 grams/minutes. A separate feed of 17 grams of acrylic acid in 33 grams of deionized water is started at the same time as the monomer emulsion feed, at the rate of 5 grams/minutes. The reaction mixture is held at 80° C. and after 10 minutes the acrylic acid cofeed is complete and the monomer emulsion feed rate is increased to 8 grams/minutes. Ten minutes later the monomer emulsion feed rate is increased again to 12 grams/minutes for twenty minutes. The monomer emulsion feed rate is increased to 18 grams/minutes and a solution of 2 grams of sodium persulfate in 85 grams of deionized water is co-fed to the kettle at the rate of 0.7 grams/min. The reaction temperature is allowed to increase to 90° C. After all of the monomer emulsion has been fed to the reaction mixture, a solution of 19.0 grams of ammonium hydroxide (28%) in 20 grams of deionized water is added to the kettle and the reaction mixture is held at 90° C. for twenty minutes. The reaction is cooled to 80° C. and a mixture of 1 grams of sodium persulfate in 30 grams of deionized water is added to the kettle. This is followed by a solution of 1.5 grams of 1% versene and 15 grams of 0.1% iron sulfate and a solution of 1.5 grams isoascorbic acid in 30 grams of deionized water. The reaction mixture is held at 80° C. for 10 minutes and then cooled to room temperature and filtered to remove any coagulum formed. The final latex product had a 43% solids content, a pH of 8.0, a S/mil. of 0.18 and a particle size of 0.82 micron. Voids were observed in the dry polymer particles through examination via the microscope method described in Example 1. Titration of in-process samples demonstrated complete core encapsulation after the polymerization 800 grams of monomer emulsion onto the core.

EXAMPLE 7

Acid-functional Monoethylenically Unsaturated Monomer (Acrylic Acid) added over first 1.6% Shell Feed (Core Particle Size=208 nm and Acid Feed Time=0 minutes)

A 5-liter round-bottomed flask was equipped with paddle stirrer, thermometer, nitrogen inlet and reflux condenser. To 1192 grants of deionized water heated to 81° C. in the flask under a nitrogen atmosphere there was added 3.6 grams of sodium persulfate dissolved in 60 grams of deionized water. This was immediately followed by 142.6 grams of the core prepared in Example 0-(b). To the kettle was added 40 grams of a monomer emulsion made up of 723 grams of deionized water, 8.04 grams of SDS and 1710.6 grams of styrene. A separate charge of 17 grams of acrylic acid in 33 grams of deionized water was added to the kettle. The remaining monomer emulsion was fed to the kettle at a rate of 4 grams/minute. The reaction mixture was held at 80° C. and after 10 minutes the monomer emulsion feed rate was the increased to 8 grams/minutes. Ten minutes later the monomer emulsion feed rate was increased to 12 grams/minutes for twenty minutes. The monomer emulsion feed rate was increased to 18 grams/minutes and a solution of 2 grams of sodium persulfate in 85 grams of deionized is co-fed to the kettle at the rate of 0.7 grams/minute. The reaction temperature was allowed to increase to 90° C. After all of the monomer emulsion had been fed to the reaction mixture, a solution of 19.0 grams of ammonium hydroxide (28%) in 20 grams of deionized was added to the kettle and the reaction mixture was held at 90° C. for twenty minutes. The reaction was cooled to 80° C. and a mixture of 1 gram of sodium persulfate in 30 grams of deionized water was added to the kettle. This was followed by a solution of 1.5 grams of 1% versene and 15 grams of 0.1% iron sulfate and a solution of 1.5 grams of isoascorbic acid in 30 grams of deionized water. The reaction mixture was held at 80° C. for 10 minutes and then cooled to room temperature and filtered to remove any coagulum formed. The final latex product had a 43% solids content, a pH of 8.0 and a particle size of 0.82 microns. Voids were observed in the dry polymer particles through examination via the microscope method described in Example 1. Titration of in-process samples demonstrated complete core encapsulation after the polymerization of 400 grams of monomer emulsion onto the core.

EXAMPLE 8

Acid-functional Monoethylenically Unsaturated Monomer (Acrylic Acid) added over 100% Shell Monomer Feed (Core Particle Size=208 nm)

The process in Example 6 was repeated except the acrylic acid was added to the styrene monomer emulsion. The final latex product had a 43% solids content, a pH of 8.4, a S/mil of 0.165 and a particle size of 0.82 micron. Voids were observed in the dry polymer particles through examination via the microscope method described in Example 1. Titration of in-process samples demonstrated complete core encapsulation after the polymerization of 2400 grams of monomer emulsion onto the core.

EXAMPLE 9

Acid-functional Monoethylenically Unsaturated Monomer (Acrylic Acid) added over first 1.6% Shell Monomer Feed (Core Particle Size=132 nm)

The process in Example 6 was repeated except 142 grams of core from example 0-c was utilized. The final latex product had a 43% solids content, a pH of 7.9, a S/mil of 0.11 and a particle size of 0.53 micron. Voids were observed in the dry polymer particles through examination via the microscope method described in Example 1. Titration of inprocess samples demonstrated complete core encapsulation after the polymerization of 1000 grams of monomer emulsion onto the core.

EXAMPLE 10

Acid-functional Monoethylenically Unsaturated Monomer (Acrylic Acid) added over 100% Shell Monomer Feed (Core Particle Size=132 nm)—Comparative Example The process in Example 8 was repeated except 142 grams of core from Example 0-(c) was utilized. After 800 grams of monomer emulsion was added the reaction mixture started to thicken. The reaction was stopped due to massive levels of coagulum. The remaining 1600 grams of monomer emulsion could not be polymerized. This comparative example demonstrated a lack of encapsulation.

EXAMPLE 11

Synthesis of Pre-Core Polymer

A 3-liter, round-bottomed flask with 4 necks was fitted with reflux condenser, paddle stirrer, thermometer and nitrogen inlet. 1500 grams of deionized water were added to the flask and stirred under a nitrogen atmosphere at 85° C. To the deionized water were added 3 grams of sodium persulfate and 40 grams of an acrylic seed latex having a 46.5% solids content and an average diameter of 95 nanometers. A monomer emulsion (140 grams of water, 6 grams of 23% SDS, 360 grams of isobutyl methacrylate and 40 grams of n-dodecyl mercaptan) was added over 2 hours along with 3 grams of sodium persulfate dissolved in 80 grams of water. The resultant latex was held at 85° C. for 30 minutes, cooled and filtered. The resultant polymer latex had an 18.7% solid content, and a average particle diameter of 260 nm.

EXAMPLE 12

Encapsulation of Core containing Nonpolymeric Acid

A 5-liter round-bottomed flask is equipped with paddle stirrer, thermometer, nitrogen inlet and reflux condenser. A mixture of 1134 grams deionized water and 51.66 g of benzoic acid is heated to 81° C. in the flask under a nitrogen atmosphere. To this mixture is added 129 grams of the pre-core polymer from example 11. After stirring at 81° C. for 15 minutes a solution of 1.5 grams of sodium persulfate in 75 grams of water is added to the kettle. A monomer emulsion consisting of 713 grams of deionized water, 6.03 grams of SDS, 2.18 grams of linseed oil fatty acid and 1283 grams of styrene is added to the kettle at the rate of 3 grams/minute. A separate feed of 12.75 grams of acrylic acid in 24.75 grams of deionized water is started at the same time as the monomer emulsion feed, at the rate of 3.8 grams/minute. A catalyst cofeed of 2.7 grams sodium persulfate in 112.5 grams of water is started at a rate of 0.7 grams/minute. The reaction mixture is held at 80° C. and after 10 minutes the acrylic acid cofeed is complete and the monomer emulsion feed rate is increased to 6 grams/minute. Ten minutes later the monomer emulsion feed rate is increased again to 9 grams/minute for twenty minutes. The monomer emulsion feed rate is increased to 13.5 grams/minute until all the monomer emulsion is added to the kettle. After the addition of 1000 grams of monomer emulsion the reaction temperature is allowed to increase to 90° C. At the end of the polymerization, a solution of 37.5 grams of ammonium hydroxide (28%) in 300 grams of deionized water is added to the kettle and the reaction mixture is held at 90° C. for twenty minutes. A mixture of 1 grams of sodium persulfate in 30 grams of deionized water is added to the kettle. This is followed by a solution of 1.5 grams of 1% versene and 15 grams of 0.1% iron sulfate and a solution of 1.5 grams isoascorbic acid in 30 grams of deionized water. The reaction mixture is held at 90° C. for 10 minutes and then cooled to room temperature and filtered to remove any coagulum formed. The reaction was found to be high in coagulum and residual styrene, but examination of the dried particles according to the method in Example 1 indicated the presence of air voids.

EXAMPLE 3

Encapsulation of Cores containing no Hydrophilic Monoethylenically Unsaturated Monomer Core/Formation of Voids via Hydrolysis of Core A 5-liter round-bottomed flask is equipped with paddle stirrer, thermometer, nitrogen inlet and reflux condenser. To 1192 grams of deionized water heated to 81° C. in the flask under a nitrogen atmosphere there is added 3.6 grams of sodium persulfate dissolved in 60 grams of deionized water. This is immediately followed by 103.89 grams of the core prepared according to the example in U.S. Pat. No. 5,157,084 assigned to Dow Chemical. A monomer emulsion consisting of 723 grams of deionized water, 8.04 grams of SDS, 2.18 grams of linseed oil fatty acid and 1710.6 grams of styrene is added to the kettle at the rate of 4 grams/minute. A separate feed of 17 grams of acrylic acid in 33 grams of deionized water is started at the same time as the monomer emulsion feed, at the rate of 5 grams/minute. The reaction mixture is held at 80° C. and after 10 minutes the acrylic acid cofeed is complete and the monomer emulsion feed rate is increased to 8 grams/minute. Ten minutes later the monomer emulsion feed rate is increased again to 12 grams/minute for twenty minutes. The monomer emulsion feed rate is increased to 18 grams/minute and a solution of 2 grams of sodium persulfate in 85 grams of deionized water is co-fed to the kettle at the rate of 0.7 grams/minute. The reaction temperature is allowed to increase to 90° C. After all of the monomer emulsion has been fed to the reaction mixture, a portion of the resulting latex is neutralized with ammonia to pH 11 and heated to 150° C. in a stainless steel reactor. Examination of dried samples of this reaction mixture according to the method in Example 1 indicated the presence of air voids.

I claim:

1. A multistaged polymer, comprising:

(a) a hydrophilic core polymer formed from about 5% by weight to about 100% by weight, based on the total weight of the core polymer, of a hydrophilic monoethylenically unsaturated monomer and from 0% by weight to about 95% by weight, based on the total weight of the core polymer, of at least one nonionic monoethylenically unsaturated monomer; and (b) a hydrophobic shell polymer formed from about 90% by weight to about 99.9% by weight, based on the total weight of shell polymer, of styrene and from about 0.1% by weight to about 10% by weight, based on the total weight of the shell polymer, of an acid-functional monoethylenically unsaturated monomer, wherein said shell polymer fully encapsulates said core polymer.

2. The multistaged polymer of claim 1 wherein said acid-functional monoethylenically unsaturated monomer is a monomer selected from the group consisting of acrylic acid, methacrylic acid, acryloxypropionic acid, methacryloxypropionic acid, acryloxyacetic acid, methacryloxyacetic acid, crotonic acid, itaconic acid, aconitic acid, maleic acid, fumaric acid, monomethyl maleate, monomethyl itaconate, monomethyl fumarate and mixtures thereof.

* * * * *